United States Patent
Jung et al.

(10) Patent No.: US 7,495,173 B2
(45) Date of Patent: Feb. 24, 2009

(54) VACUUM HOUSING

(75) Inventors: Juergen Jung, Herborn (DE); Joerg Stanzel, Wetzlar (DE)

(73) Assignee: Hilti Aktiengesellschaft, Li-9494 Schaan (LI)

( * ) Notice: Subject to any disclaimer, the term of this patent is extended or adjusted under 35 U.S.C. 154(b) by 128 days.

(21) Appl. No.: 11/603,996

(22) Filed: Nov. 21, 2006

(65) Prior Publication Data
US 2007/0125515 A1  Jun. 7, 2007

(30) Foreign Application Priority Data
Dec. 12, 2005  (DE) .................. 10 2005 059 208

(51) Int. Cl.
*H02G 15/08* (2006.01)
(52) U.S. Cl. ........................................ 174/91
(58) Field of Classification Search ............ 174/91; 165/46; 277/614, 643, 644, 648, 649
See application file for complete search history.

(56) References Cited

U.S. PATENT DOCUMENTS

| 3,078,332 | A | * | 2/1963 | Marx | 174/91 |
| 3,208,758 | A | * | 9/1965 | Carlson et al. | 277/638 |
| 5,445,393 | A | * | 8/1995 | Ramberg | 277/643 |
| 5,640,751 | A | * | 6/1997 | Faria | 29/525.02 |
| 2003/0011143 | A1 | * | 1/2003 | Shinoda et al. | 277/614 |

* cited by examiner

*Primary Examiner*—Chau N Nguyen
(74) *Attorney, Agent, or Firm*—Abelman, Frayne & Schwab

(57) ABSTRACT

A vacuum housing includes a cylindrical section, a flange, and a ring arranged concentrically with the cylindrical section and forming part of the flange, with the ring being formed of a harder material than the remaining of the housing, and having an annular knife edge extending in an axial direction and in a direction away from the cylindrical section, with the knife edge forming part of the flange surface.

8 Claims, 7 Drawing Sheets

VACUUM HOUSING

BACKGROUND OF THE INVENTION

1. Field of the Invention

The present invention relates to a vacuum housing having a cylindrical section and a flange.

2. Description of the Prior Art

In ultra-high vacuum technology (UHV-technology), metal seals should be provided in flange connections of vacuum components such as, e.g., vacuum chambers and vacuum pumps. These seals are subjected to very high temperatures, which characterize UHV-systems. These temperatures are too high for elastomeric seals. Therefore, special flanges, which are formed of stainless steel and have knife edges, are used. The knife edges penetrate in a weaker material. As a weaker material copper is primarily used. Such flanges are disclosed in Wutz, Walcher, $8^{th}$ edition, page 634.

The drawback of this state of the art consists in that not only flanges themselves should be produced of such metals as stainless steel. In the state of the art, the complete vacuum housings can be produced of expensive materials. With the production of large apparatuses such as vacuum pumps, increased costs are associated.

Accordingly, an object of the present invention is a vacuum housing that has reduced manufacturing costs and, at the same time, is suitable for use in UHV-systems.

SUMMARY OF THE INVENTION

This and other objects of the present invention, which will become apparent hereinafter, are achieved by providing a housing of the type described above and further including a ring arranged concentrically with the cylindrical section and forming part of the flange, formed of a harder material than the remaining of the housing, and having an annular knife edge extending in an axial direction and in a direction away from the cylindrical section, with the life edge forming a part of the flange surface.

According to the present invention, there is provided a ring which forms a part of or the entire UHV-suitable flange. The ring is connected with the remaining portion of the vacuum housing in a UHV-sealed way. With the inventive ring, it is possible to form the major portion of the housing of an economical material, e.g., aluminum and its alloy.

According to the first embodiment of the invention, the ring is fixedly connected with the remaining portion of the housing. This insures a high reliability against high mechanical loads. Such loads can be produced by so-called rotors/stator crash of a turbomolecular pump, and can be transmitted to the housing by the flange that connects the turbomolecular pump with the housing.

The ring can be economically connected with the housing by a screw connection which is economical and, at the same time, very stable. Alternatively, the ring can be connected with the housing by press fit. Also, friction twist welding can be used for connecting the ring with the housing. This welding process provides, in comparison with other welding processes, a particularly reliable connection.

According to another embodiment of the invention, the ring has, in addition to the flange knife edge, a further knife edge extending in the axial direction and in a direction toward the cylindrical section.

This substantially improves the vacuum tightness.

A further improvement of vacuum tightness is achieved by providing a yet another knife edge extending in a radial direction.

An improvement in vacuum tightness is achieved when a further ring is arranged between the first ring and a remaining portion of the vacuum housing. The further ring is formed of a material that is weaker than the material of the remaining portion of the housing and of the first ring. The further or the second ring, in this case, forms a seal. Advantageously, the second ring is formed of copper because copper insures a good adaptation of heat expansion to other conventional flange and housing materials.

Advantageously, the ring with the knife edges or the first ring is formed of stainless steel. The cylindrical section of the vacuum housing is advantageously formed of aluminum as it has very good heat conducting characteristics. This is very advantageous for cooling of the installation.

According to one embodiment, the inventive vacuum housing forms a housing of a vacuum chamber. Because the housing need not be formed of steel, the saving effect is particularly large as the vacuum chamber sometimes can have very large dimensions.

According to another embodiment of the invention, the inventive vacuum housing forms a housing of a vacuum pump. Here, it is particularly advantageous that not only costs are reduced but a material is used that can remove heat, which is produced upon compression of gases in a vacuum pump, much better than steel.

The novel features of the present invention, which are considered as characteristic for the invention, are set forth in the appended claims. The invention itself, however, both as to its construction and its mode of operation, together with additional advantages and objects thereof, will be best understood from the following detailed description of the preferred embodiments, when read with reference to the accompanying drawings.

DETAILED DESCRIPTION OF THE PREFERRED EMBODIMENT

Figure 1:
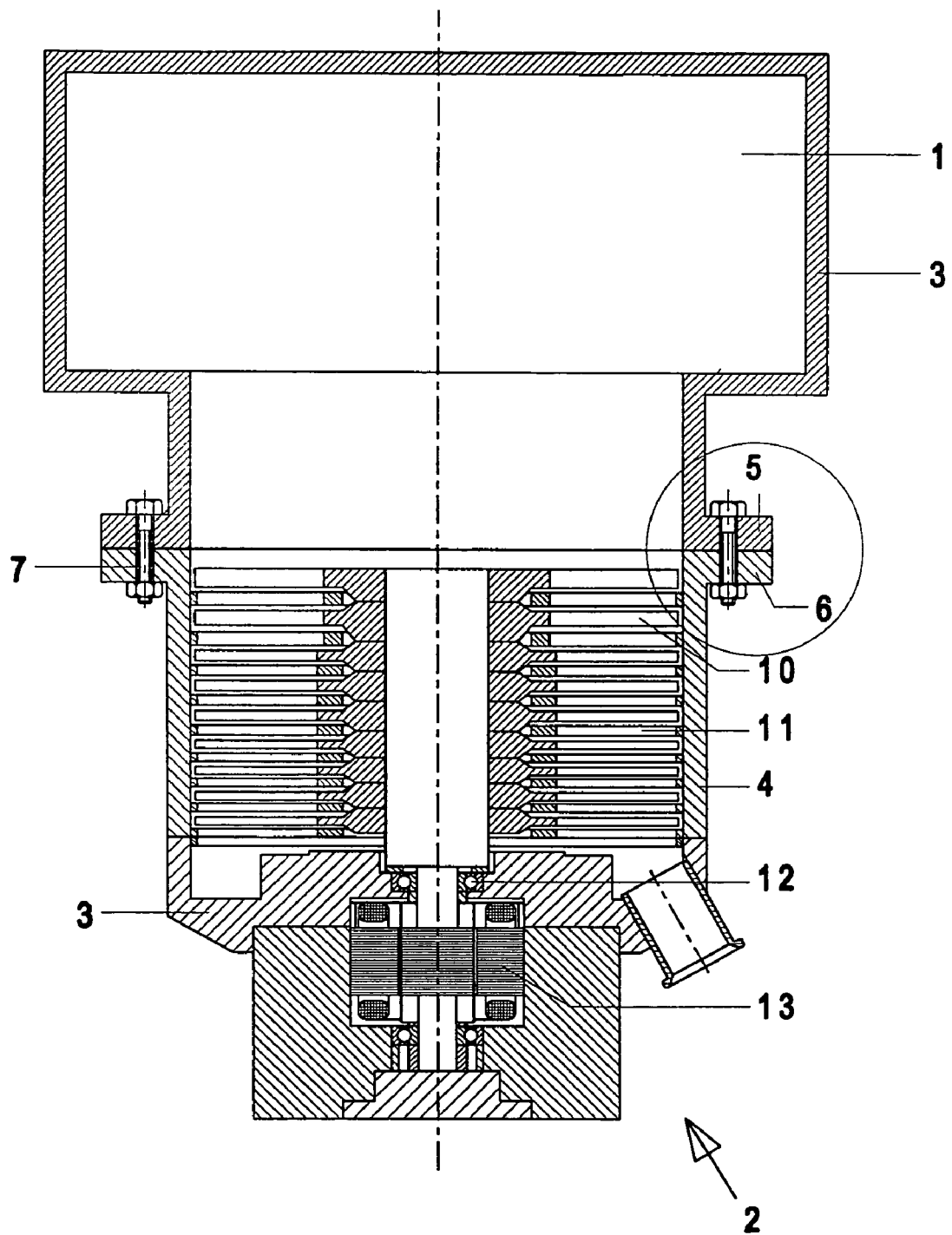
FIG. 1 a principal cross-sectional view of a vacuum installation for producing ultra-high vacuum.

FIG. 1 shows a simplified principal view of an ultra-high vacuum installation that has an ultra-high vacuum chamber 1, further simply chamber, which is connected with an ultra-high vacuum pump 2, further simply pump. The chamber 1 and the pump 2 each has a housing 3, 4, respectively. In FIG. 1, the pump is schematically shown as a turbomolecular vacuum pump including a rotor 10 supported on a rotor shaft and having a plurality of vanes, and a stator 11 in which vane discs and spacer rings are arranged. The rotor 10 is supported in bearings 12 and is driven with high speed by a drive 13. The chamber 1 and the pump 2 have a flange 5, 6, respectively. The flanges 5, 6, are brought into abutment with each other and are connected by a plurality of flange screws 7.

Figure 2:
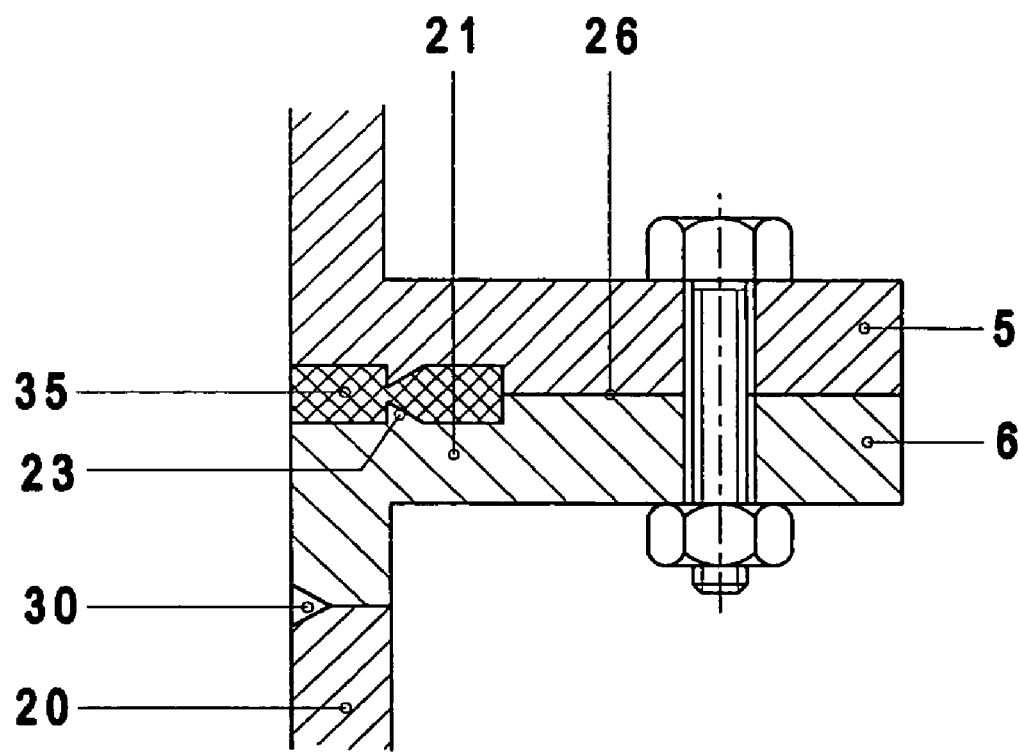
FIG. 2 a cross-sectional view of a flange connection of the ultra-high vacuum installation shown in FIG. 1 according to a first embodiment of the present invention.

FIG. 2 shows a first embodiment of a vacuum housing according to the present invention and which can represent both the pump housing and the chamber housing. A cylindrical section 20 of the housing can be formed of a first material, e.g., an aluminum alloy. Concentrically with the cylindrical section 20, there is provided a first ring 21 formed of a hard material, e.g., stainless steel. The ring 21 and the cylindrical section 20 are connected with each other by a weld seam 30. For connecting the two parts, different welding processes can be used. Advantageously but not exclusively, friction welding is used. The first ring 21 has a knife edge 23 that is supported against a surface and that extends circumferentially along this surface, surrounding the through-opening. The knife-edge supporting surface forms part of a flange surface 26. Upon connection of the flanges, the knife edge is pressed into a metallic sealing ring 35. The sealing ring 35 is formed of a mechanically weak metal, primarily copper.

Figure 3:
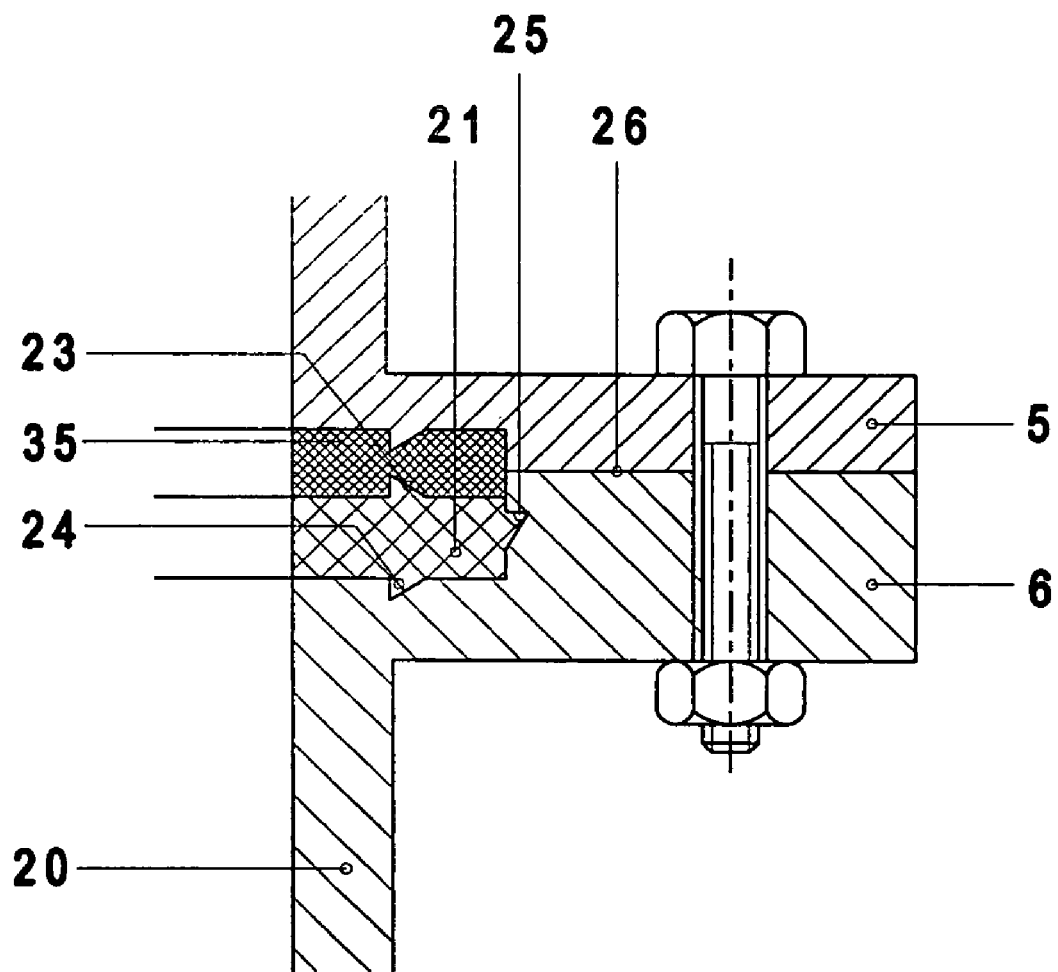
FIG. 3 a cross-sectional view of a flange connection of the ultra-high vacuum installation shown in FIG. 1 according to a second embodiment of the present invention.

FIG. 3 shows an improved embodiment of an inventive vacuum housing. In this embodiment, the first ring 21 is located in a recess formed in the cylindrical section 20. In addition to the knife edge 23 that cuts into the sealing ring 35, the first ring 21 has an additional knife edge 24 that extends in the direction of the housing. On the outer surface of the first ring 21, there is also provided a further knife edge 25 that extends radially outwardly.

The additional knife edges 23, 24 further increase the sealing properties and mechanical stability. The mechanical stability includes the connection of the ring and the cylindrical section. This connection still remains reliable when the flange connection between the pump and chamber flanges becomes loose. The combination improves both the seal and the stability. In this embodiment the ring is pressed in.

Figure 4:
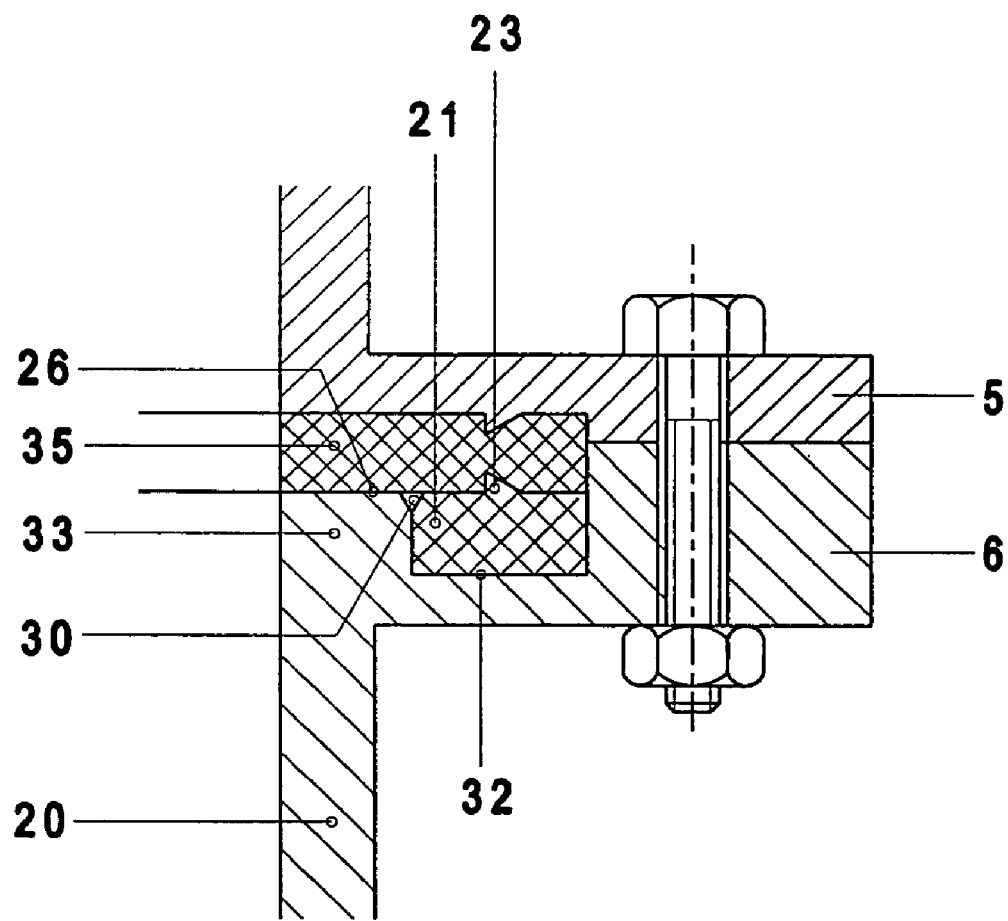
FIG. 4 a cross-sectional view of a flange connection of the ultra-high vacuum installation shown in FIG. 1 according to a third embodiment of the present invention.

FIG. 4 shows an embodiment of the inventive vacuum housing improved further in comparison with the embodiment described immediately above. The first ring 21 is arranged in a recess 32 and is surrounded on its three sides with the material of the cylindrical section 20. A projection 33 of the cylindrical section 20 projects into the interior of the first ring 20. Advantageously, the projection 33 end, in the axial direction at the flange surface 26. A weld seam 30 connects the first ring 21 and the cylindrical section 20. The weld seam 30, on one hand, secures the arrangement and, on the other hand, sealed the arrangement against gas leak very good. Because of being provided on the end surface, the weld seam 30 can be formed particularly easy. For forming the weld seam 30, as discussed above, different welding processes can be used. The location of the weld seam 30 between the projection 33 and the first ring 21 is particularly advantageous because in this case, the weld seam 30 is oriented toward an inner side of the ring. This prevents penetration of gas which eventually would accumulate in space between the first ring 21 and the cylindrical section 20, into the high-vacuum region.

Figure 5:
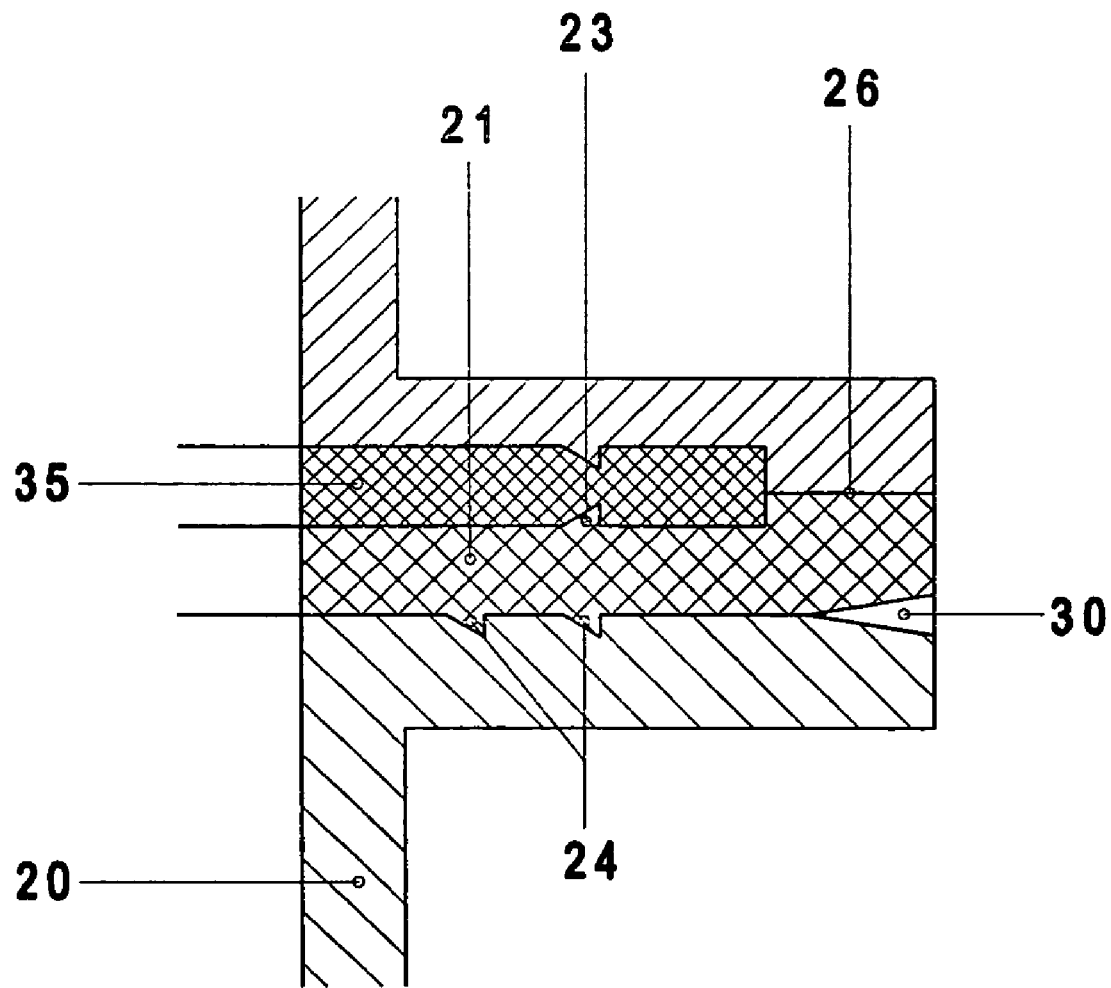
FIG. 5 a cross-sectional view of a flange connection of the ultra-high vacuum installation shown in FIG. 1 according to a fourth embodiment of the present invention.

In the embodiment of an inventive vacuum housing shown in FIG. 5, the first ring 21 is likewise arranged concentrically with the cylindrical section 20 but not in a recess. The knife edge 23, which cuts into the sealing ring 35, is formed on the flange surface 26. There are further provided two knife edges 24 extending in the direction of the cylindrical section 20. Dependent on surface ratio, more than two knife edges can be provided to obtain a very high seal. In the embodiment shown in FIG. 5, the first ring 21 is connected with the cylindrical section 20 by a weld seam 30. As before, different welding processes can be used for forming the weld seam 30. Advantageously frictional twist welding is used and which produces particular stable and, therefore, mechanically reliable weld seams. If sufficient space is available, a weld seam can be formed on the inner circumference of the contact interface between the cylindrical section and the first ring 21.

Figure 6:
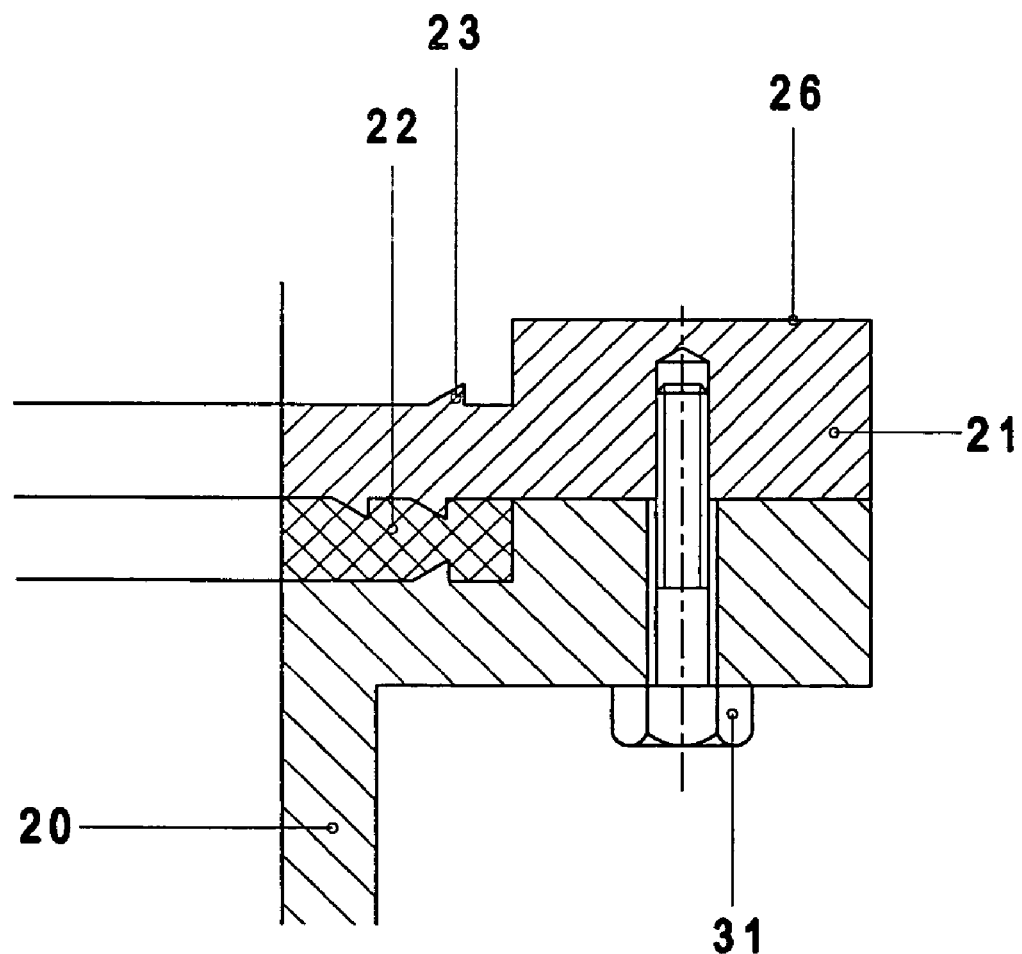
FIG. 6 a cross-sectional view of a flange connection of the ultra-high vacuum installation shown in FIG. 1 according to a fifth embodiment of the present invention.

The embodiment of an invention vacuum housing shown in FIG. 6 clarifies two advantageous measures according to the present invention. As a first measure, a second ring 22 is arranged in a recess between the cylindrical section 20 and the first ring 21. The second ring 22 is formed of a material that is mechanically weaker than the material of both the cylindrical section 20 and the first ring 21, e.g., the second ring 22 can be formed of copper. The knife edges that cut into the second ring 22, can be provided on both the cylindrical section 20 and the first ring 21. As a second measure, the first ring 21 is connected with the cylindrical section 20 by a plurality of screws 31. In the embodiment shown in FIG. 6, the screws are so set in that they extend through bores formed in the cylindrical section 20 and are screwed in the first ring 21. Dependent on geometrical ratios, it could be beneficial to form bores in the first ring 21 and the receiving threads in the cylindrical section 20.

Figure 7:
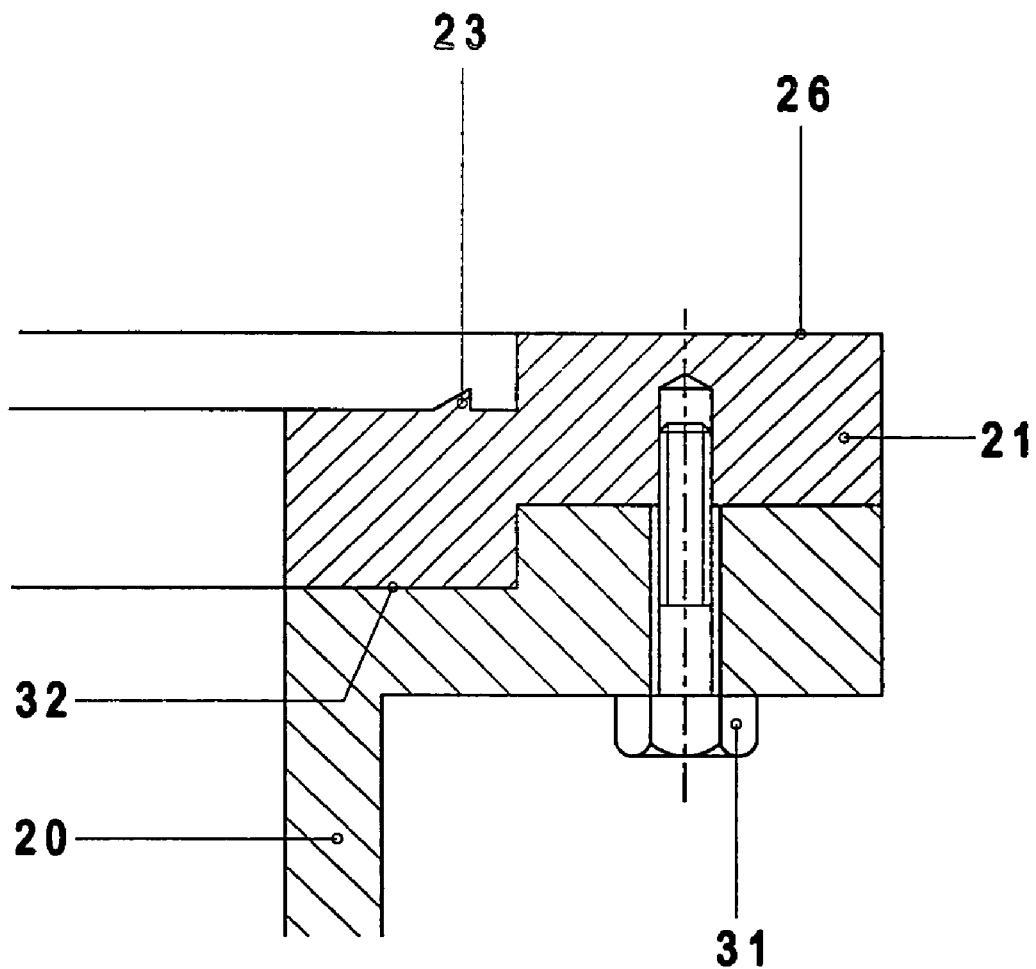
FIG. 7 a cross-sectional view of a flange connection of the ultra-high vacuum installation shown in FIG. 1 according to a sixth embodiment of the present invention.

The embodiment of the inventive vacuum housing shown in FIG. 7 illustrates a simple solution that consists in that a recess 32 is formed in the cylindrical section 20. The first ring 21 is adapted to the recess 32, forming a step that increases the vacuum seal. The first ring 21 is secured with screws 31 which are either screwed in the first ring 21 as in the preceding embodiment, or are screwed in opposite direction from the flange surface. As in the preceding embodiment, a knife edge 23 is provided on the flange surface 26.

It is possible to enhance the foregoing measures with a coating applied to contact surfaces partially or completely and, in particular, to the knife edges. The coating increases hardness of the knife surfaces whereby mechanical stability and sealing property are improved further. As a matter of course, surfaces located opposite the knives can also be coated.

The features, which are described in the specification in connection with different embodiments and which are claimed in different claims can be suitably combined.

Though the present invention was shown and described with references to the preferred embodiments, such is merely illustrative of the present invention and is not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. A vacuum housing, comprising a cylindrical section; a flange having a flange surface; and a ring arranged concentrically with the cylindrical section and forming part of the flange, said ring being formed of a harder material than the remaining of the housing, and said ring having an annular knife edge extending in an axial direction and in a direction away from the cylindrical section, the knife edge forming part of the flange surface, wherein said ring has a further knife edge extending in the axial direction and in a direction toward the cylindrical section, and wherein said vacuum housing comprises a further ring located in the axial direction between the ring with knife edges and the cylindrical section and formed of a material that is weaker than material of the cylindrical section and of the ring.

2. A vacuum housing according to claim 1, wherein the ring is connected with said cylindrical section.

3. A vacuum housing according to claim 2, wherein the ring is connected with the cylindrical section by screws.

4. A vacuum housing according to claim 1, wherein the further ring is formed of a copper alloy.

5. A vacuum housing according to claim 1, wherein the ring is formed of stainless steel.

6. A vacuum housing according to claim 1, wherein the cylindrical section is formed of an aluminum alloy.

7. A vacuum housing according to claim 1, wherein the vacuum housing forms a housing of a vacuum chamber.

8. A vacuum housing according to claim 1, wherein the vacuum housing forms a housing of a vacuum pump.

* * * * *